June 26, 1945. L. KIESOW 2,378,931
BABY CARRIAGE
Filed Nov. 19, 1942 2 Sheets-Sheet 1

Inventor:
Lothar Kiesow.
by
Attorneys

June 26, 1945.  L. KIESOW  2,378,931
BABY CARRIAGE
Filed Nov. 19, 1942  2 Sheets-Sheet 2
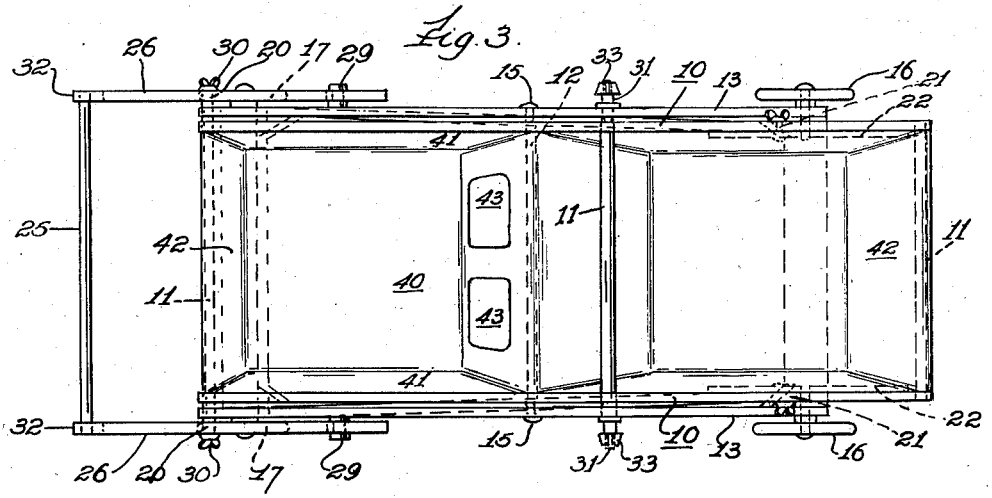
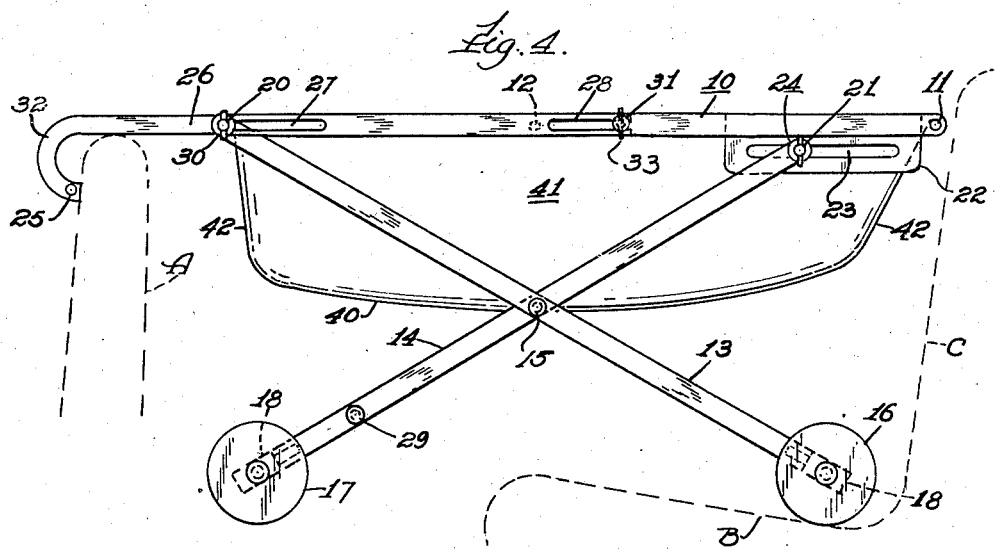
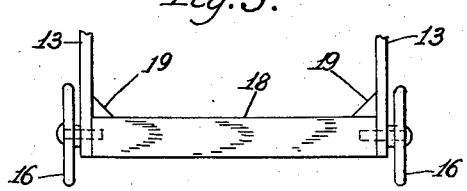
Inventor.
Lothar Kiesow.
by
Attorneys Patented June 26, 1945

2,378,931

UNITED STATES PATENT OFFICE 2,378,931

BABY CARRIAGE

Lothar Kiesow, Wheaton, Ill., assignor to Sears, Roebuck and Co., Chicago, Ill., a corporation of New York Application November 19, 1942, Serial No. 466,131

13 Claims. (Cl. 280—41)

This invention relates to baby carriages of the type sometimes referred to as strollers. One object of the invention is to provide a novel and improved structure for a baby carriage and particularly one which can be economically manufactured with a minimum of metallic parts. Another object of the invention is to provide a baby carriage or stroller having supporting mechanism by which the body of the carriage is adjustable at different heights from the ground. A further object of the invention is to provide means for readily adjusting the body portion of the vehicle to support a child either in sitting position or lying down. It is also an object of the invention to provide a vehicle of this type with a handle portion adjustable either to a substantially upright position for use in wheeling the vehicle or to an extended horizontal position for partially supporting the vehicle on the seats of an automobile.

Other objects and advantages of the invention will appear from the following description taken in conjunction with the drawings in which:

Fig. 3 is a top plan view of the vehicle adjusted for use as in Fig. 1.

Fig. 4 is a side elevation showing the carriage adjusted with the wheels at an intermediate position as compared with Figs. 1 and 3 and with the handle adjusted to cooperate in the support of the carriage on the front and rear seats of an automobile, the position of such seats being indicated in broken lines.

Fig. 5 is a fragmentary end view showing the frame structure to which the wheels are attached.

Figure 1:
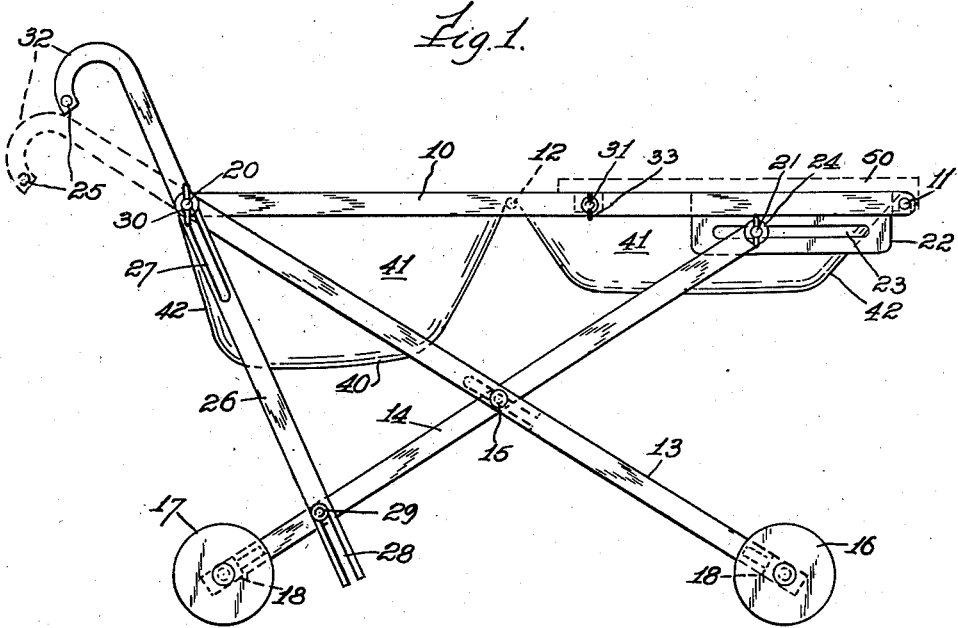
Fig. 1 is a side elevation of a baby carriage embodying this invention showing the vehicle adjusted for use as a stroller.

While there is shown and described herein certain specific structure embodying the invention, it will be manifest to those skilled in the art that various modifications and rearrangements of the parts may be made without departing from the spirit and scope of the invention, and that the same is not limited to the particular forms herein disclosed, except in so far as indicated by the appended claims.

With a view to economical manufacture the baby carriage embodying this invention has been designed so that its frame may be constructed almost entirely of wood in order to assist in the conservation of metal at the present time and the various parts are therefore shaped and proportioned for such construction, but it may be understood that the mechanical relation of the parts may be duplicated with metallic frame elements if desired. As shown in the drawings the body portion of the vehicle includes flexible side and bottom walls of canvas, imitation leather, or other suitable fabric supported by a rectangular frame comprising side members 10, 10 and cross members 11 at the ends of the frame and at an intermediate position therein. An additional cross member 12 is removably secured at about the middle of the frame for a purpose which will later be described. The main frame is supported by leg members 13 and 14 arranged in pairs at each side of the vehicle crossed upon each other and pivotally connected by a bolt or rivet 15. At their lower ends the members 13 and 14 are supported on front wheels 16 and rear wheels 17 and transverse connecting members 18 extending between the lower ends of the leg members at or adjacent the axes of the wheels. These cross members 18 may serve as axles or may be merely frame members and in either case they are braced to the leg members 13 and 14 as by corner blocks 19 to add rigidity to the frame structure.

Figure 2:
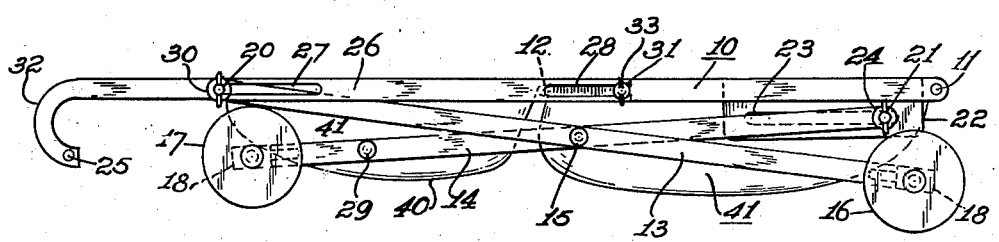
Fig. 2 is a side elevation of the carriage in folded or collapsed position for storage or shipment.

Each of the X-shaped supports composed of a leg 13 and a leg 14 is adjustable by angular movement of the leg members about their connecting pivot 15 for either collapsing the supporting structure to a position shown in Fig. 2 or for adjusting the height of the body-carrying frame from the ground. To permit such adjustment the upper end of each leg 13 is pivotally connected to the rear ends of the side members 10 by a bolt 20 and the upper end of each leg member 14 is secured by a clamping bolt 21 to a slotted plate 22 attached to the member 10 near its forward end. The slot 23 of the plate 22 extends horizontally so that upon loosening the bolt 21 the end of the leg member 14 may be slidably shifted along the slot 23 and secured at any desired position therein by tightening the wing nut 24 on the bolt 21. Fig. 2 shows the bolt 21 near the extreme forward end of the slot 23, while Fig. 4 shows the bolt 21 adjusted at an intermediate position resulting in adjusting the vehicle body to an intermediate height as compared with its fully elevated position shown in Fig. 1 and the collapsed position illustrated in Fig. 2.

A handle comprising a cross-bar 25 and side arms 26 is formed with longitudinal slots 27 through which the bolts 20 at the rear of the frame extend. At the ends of the side arms 26 opposite the handle 25 are formed open-ended slots 28 and when the vehicle is to be propelled by the handle 25 the slots 28 are engaged with studs 29 projecting laterally from the leg members 14 near their lower ends. The bolts 20 are fitted with wing nuts 30 so that by tightening these wing nuts the handle will be firmly clamped to the frame members 10 and will act as a strut to assist in holding the leg members 14 at their adjusted position. That is a portion of the weight carried by the body frame members 10 will be transmitted directly through the side arms 26 of the handle to the lower ends of the legs 14 by the upper ends of the slots 28 resting upon the studs 29. This will supplement the holding effect of the clamping wing nuts 24 which maintain the angular adjustment of the legs 13 and 14 with respect to each other and with respect to the side members 10 and it will relieve the lower ends of the leg members 14 of some of the bending strain which they would otherwise experience. If it is desired to partially lower the body and still use the handle for propelling the vehicle on its wheels the X-frames composed of leg members 13 and 14 may be adjusted by loosening the clamp nuts 24 and sliding the bolts 21 along the slots 23, at the same time loosening the clamp nuts 30 and permitting the bolts 20 to travel downwardly in the slots 27 of the handle arms so that at any position of adjustment at which the clamp nuts 30 are again tightened the handle may also be clamped so as to assume its portion of the load.

In collapsing the vehicle for storage or for shipment the clamping nuts 30 are loosened to permit the handle to be slid upwardly until its slots 28 are disengaged from the studs 29. It is then swung about the bolts 20 so that the slots 28 may be engaged with studs 31 projecting laterally from the frame members 10 at about the middle of their length. This aligns the side arms 26 of the handle with the frame bars 10 and in this position the curved end portions 32 of the side arms 26 which support the handle 25 are disposed so that they occupy no more height than the wheels 16 and 17, as seen in Fig. 2. The vehicle thus becomes a relatively compact package which may be wrapped for shipment or easily carried about. The studs 31 are preferably provided with wing nuts 33 to supplement the clamping effect of the wing nuts 30 in holding the handle in this position of adjustment and the tightening of the wing nuts 24 will serve to maintain the leg members 13 and 14 in collapsed position.

If the carriage is to be transported in an automobile in a position to serve either as a bed or as a seat for the infant, the handle may be left in its horizontal position as shown in Fig. 4 and by readjusting the clamping nuts 24 the wheels 16 may be lowered just far enough so that with the projecting end portion of the handle resting on the back of the front seat A of the automobile, the wheels 16 will be supported on the seat portion B of the rear seat. In some instances the wheel 16 may fit into the angle between the seat portion B and back C of the rear seat, but if the span is too great the baby carriage will be carried by its handles resting upon the back of the front seat A and its wheels 16 resting upon any portion of the rear seat B.

The fabric body forming the seat or bed portion of the vehicle will include a flexible bottom portion 40 with side walls 41 and end walls 42 and the side and end walls may be attached to the side frame members 10 and cross members 11 in any convenient manner as by folding them over these members and stitching them in position or by employing detachable snap fasteners or straps with buckles or any other convenient securing means. Such features constitute no part of the present invention and are therefore not described or shown in detail. However, it may be understood that the bottom wall 40 is preferably made with openings 43 to accommodate the legs of the infant when he rides in a sitting posture and that at such times the middle portion of the bottom wall 40 will be elevated and supported transversely by the cross member 12. This member may be simply a round bar with slightly reduced end portions entering holes or recesses in the side frame members 10. These members are sufficiently flexible so that they can be spread apart temporarily to release the cross bar 12 when it is desired to lower the flexible bottom wall 40 so as to utilize it as a bed which the infant will occupy in reclining position. Such an arrangement of the flexible body is indicated in Fig. 4, although it may be understood that this arrangement is not required when the frame is supported in an automobile as suggested by Fig. 4, the adjustment of the flexible body of the vehicle being quite independent of the adjustment of the frame. The flexibility of the body permits it to be collapsed into any convenient form when the frame is fully collapsed as shown in Fig. 2 for storage or convenient handling.

The flat upper edges of the side members 10, 10, will conveniently support a tray 50 which may extend over the forward portion of the frame as indicated in dotted outline in Fig. 1, and the tray may be provided with any suitable positioning means engageable with the cross members 11 to hold it in place. This will adapt the vehicle to serve as a high chair for the child indoors, or when the forward section of the body is employed to carry packages, the tray will act as a cover for this space.

I claim:

1. In a baby carriage frame, a pair of side members, a pair of crossed supporting legs associated with each side member and pivotally connected together intermediate their ends, wheels carried by said legs at their lower ends, means pivotally connecting the upper end of one leg of each pair with its associated side member, and means securing the upper end of the other leg of each pair to said side member, said securing means being adjustable longitudinally of the side members to vary the height at which said members are carried by the supporting legs, together with a handle comprising a pair of side arms and a cross bar, pivotal means by which the side arms are attached to the side members respectively, adjacent one end of the frame, and additional means on one of each pair of supporting legs engageable with the ends of said side arms remote from the cross bar, whereby the side arms act to brace the frame.

2. In a baby carriage frame, a pair of side members, a pair of crossed supporting legs associated with each side member and pivotally connected together intermediate their ends, wheels carried by said legs at their lower ends, means pivotally connecting the upper end of one leg of each pair with its associated side member, and means securing the upper end of the other leg of each pair to said side member, said securing means being adjustable longitudinally of the side members to vary the height at which said members are carried by the supporting legs, together with a handle comprising a pair of side arms and a cross bar, the side arms having slots intermediate their ends, pivots extending from the side members into said slots, and means on the frame engageable with the ends of said handle side arms and disengageable by longitudinal movement of the arms as permitted by said slots.

3. In a baby carriage frame, a pair of side members, a pair of crossed supporting legs associated with each side member and pivotally connected together intermediate their ends, wheels carried by said legs at their lower ends, means pivotally connecting the upper end of one leg of each pair with its associated side member, and means securing the upper end of the other leg of each pair to said side member, together with a handle comprising a pair of side arms and a cross bar, the side arms having slots intermediate their ends, pivots extending from the side members into said slots, and means on one of each pair of supporting legs engageable with the ends of said handle side arms remote from the cross bar and disengageable by merely longitudinal movement of the arms as permitted by said slots.

4. In a baby carriage frame, a pair of side members, a pair of crossed supporting legs associated with each side member and pivotally connected together intermediate their ends, wheels carried by said legs at their lower ends, means pivotally connecting the upper end of one leg of each pair with its associated side member, and means securing the upper end of the other leg of each pair to said side member, said securing means being adjustable longitudinally of the side members to vary the height at which said members are carried by the supporting legs, together with a handle comprising a pair of side arms and a cross bar, the side arms having slots intermediate their ends, pivots extending from the side members into said slots, and means on the frame engageable with the ends of said handle side arms and disengageable by longitudinal movement of the arms as permitted by said slots, said last mentioned means being positioned to hold the handle with its side arms extending transversely of the side members and with the cross bar elevated with respect thereto, and additional means on the frame similarly engageable with said ends of the handle side arms and similarly disengageable therefrom positioned to hold the arms extended horizontally and beyond the side members at one end of the frame.

5. In a baby carriage frame, a pair of side members, a handle comprising a pair of side arms and a cross bar, the side arms having slots intermediate their ends, pivots extending from the side members into said slots, the ends of said side members having open-ended slots, and studs projecting laterally from the frame engageable with the slots in the ends of said side arms and disengageable by longitudinal movement of the arms as permitted by the slots in their intermediate portions, said studs including a pair projecting from the side members, respectively, to hold the handle with its side arms extending horizontally beyond one end of the frame and another pair projecting laterally from the lower portions of the frame to hold the handle with its side arms extending transversely of the side members and with its cross bar elevated with respect thereto.

6. In a baby carriage frame, a pair of side members, a pair of crossed supporting legs associated with each side member and pivotally connected together intermediate their ends, wheels carried by said legs at their lower ends, means pivotally connecting the upper end of one leg of each pair with its associated side member, and means securing the upper end of the other leg of each pair to said side member, said securing means being adjustable longitudinally of the side members to vary the height at which said members are carried by the supporting legs, together with a handle comprising a pair of side arms and a cross bar, the side arms having slots intermediate their ends, pivots extending from the side members into said slots, the end portions of said side arms remote from the handle having open-ended slots, and studs projecting laterally at the pivotal connections of the leg members and engageable with said open slots for holding the handle with its cross bar elevated above the level of the side members, said open slots being disengageable from the studs by longitudinal movement of the arms as permitted by their intermediate slots and the handle being swingable about the pivots which engage said latter slots when the frame is to be collapsed into compact form.

7. In a baby carriage frame, a pair of side members, a pair of crossed supporting legs associated with each side member and pivotally connected together intermediate their ends, wheels carried by said legs at their lower ends, means pivotally connecting the upper end of one leg of each pair with its associated side member, and means securing the upper end of the other leg of each pair to said side member, together with a handle comprising a pair of side arms and a cross bar, means by which the side arms are attached against upward movement relative to the side members respectively, adjacent one end of the frame, and additional means on one of each pair of supporting legs engageable with the ends of said side arms remote from the cross bar, whereby the side arms act to brace the frame.

8. In a baby carriage frame, a pair of side members, a pair of crossed supporting legs associated with each side member and pivotally connected together intermediate their ends, wheels carried by said legs at their lower ends, means pivotally connecting the upper end of one leg of each pair with its associated side member, and means securing the upper end of the other leg of each pair to said side member, together with a handle comprising a pair of side arms and a cross bar, means by which the side arms are attached, respectively, to and against upward movement relative to one of each pair of supporting legs at the upper portions thereof, and additional means on the other of each pair of supporting legs engageable with the ends of said side arms remote from the cross bar, whereby said side arms act to brace the frame.

9. In a baby carriage frame, a pair of side members, a pair of crossed supporting legs associated with each side member and pivotally connected together intermediate their ends, wheels carried by said legs at their lower ends, means pivotally connecting the upper end of one leg of each pair with its associated side member, and means securing the upper end of the other leg of each pair to said side member, said securing means being adjustable longitudinally of the side members to vary the height at which said members are carried by the supporting legs, together with a handle comprising a pair of side arms and a cross bar, means by which the side arms are attached against upward movement relative to the side members respectively, adjacent one end of the frame, and additional means on one of each pair of supporting legs engageable with the ends of said side arms remote from the cross bar, whereby the side arms act to brace the frame.

10. In a baby carriage frame, a pair of side members, a pair of crossed supporting legs associated with each side member and pivotally connected together intermediate their ends, wheels carried by said legs at their lower ends, means pivotally connecting the upper end of one leg of each pair with its associated side member, and means securing the upper end of the other leg of each pair to said side member, said securing means being adjustable longitudinally of the side members to vary the height at which said members are carried by the supporting legs, together with a handle comprising a pair of side arms and a cross bar, the side arms having slots intermediate their ends, means extending from the side members into said slots, and means on the frame engageable with the ends of said handle side arms and disengageable by longitudinal movement of the arms as permitted by said slots.

11. In a baby carriage frame, a pair of side members, a pair of crossed supporting legs associated with each side member and pivotally connected together intermediate their ends, wheels carried by said legs at their lower ends, means pivotally connecting the upper end of one leg of each pair with its associated side member, and means securing the upper end of the other leg of each pair to said side member, together with a handle comprising a pair of side arms and a cross bar, the side arms having slots intermediate their ends, means extending from the side members into said slots, and means on one of each pair of supporting legs engageable with the ends of said handle side arms remote from the cross bar and disengageable by merely longitudinal movement of the arms as permitted by said slots.

12. In a baby carriage frame, a pair of side members, a pair of crossed supporting legs associated with each side member and pivotally connected together intermediate their ends, wheels carried by said legs at their lower ends, means pivotally connecting the upper end of one leg of each pair with its associated side member, and means securing the upper end of the other leg of each pair to said side member, together with a handle comprising a pair of side arms and a cross bar, the side arms having slots intermediate their ends, pivots extending from the side members into said slots, and means on the frame engageable with the ends of said handle side arms and disengageable by longitudinal movement of the arms as permitted by said slots, said last mentioned means being positioned to hold the handle with its side arms extending transversely of the side members and with the cross bar elevated with respect thereto, and additional means on the frame similarly engageable with said ends of the handle side arms and similarly disengageable therefrom positioned to hold the arms extended horizontally and beyond the side members at one end of the frame.

13. In a baby carriage frame, a pair of side members, a pair of crossed supporting legs associated with each side member and pivotally connected together intermediate their ends, wheels carried by said legs at their lower ends, means pivotally connecting the upper end of one leg of each pair with its associated side member, and means securing the upper end of the other leg of each pair to said side member, together with a handle comprising a pair of side arms and a cross bar, the side arms having slots intermediate their ends, pivots extending from the side members into said slots, the end portions of said side arms remote from the handle having open-ended slots, and studs projecting laterally at the pivotal connections of the leg members and engageable with said open slots for holding the handle with its cross bar elevated above the level of the side members, said open slots being disengageable from the studs by longitudinal movement of the arms as permitted by their intermediate slots and the handle being swingable about the pivots which engage said latter slots when the frame is to be collapsed into compact form.

LOTHAR KIESOW.